United States Patent [19]
Takahashi et al.

[11] Patent Number: 5,825,878
[45] Date of Patent: Oct. 20, 1998

[54] SECURE MEMORY MANAGEMENT UNIT FOR MICROPROCESSOR

[75] Inventors: Richard Takahashi, Phoenix, Ariz.; Daniel N. Heer, Newton, N.H.

[73] Assignee: VLSI Technology, Inc., San Jose, Calif.

[21] Appl. No.: 717,106

[22] Filed: Sep. 20, 1996

[51] Int. Cl.⁶ .................................................. H04L 9/00
[52] U.S. Cl. ............................................. 380/4; 380/25
[58] Field of Search ........................... 380/3, 4, 23, 25, 380/52

[56] References Cited

U.S. PATENT DOCUMENTS 5,377,264  12/1994  Lee .
5,386,469  1/1995   Yearsley .
5,452,355  9/1995   Coli .
5,459,851  10/1995  Nakajima .

*Primary Examiner*—David Cain
*Attorney, Agent, or Firm*—LaValle D. Ptak

[57] ABSTRACT

A secure embedded memory management unit for a microprocessor is used for encrypted instruction and data transfer from an external memory. Physical security is obtained by embedding the direct memory access controller on the same chip with a microprocessor core, an internal memory, and an encryption/decryption logic. Data transfer to and from an external memory takes place between the external memory and the memory controller of the memory management unit. All firmware to and from the external memory is handled on a page-by-page basis. Since all of the processing takes place on buses internal to the chip, detection of clear unencrypted instructions and data is prevented.

7 Claims, 2 Drawing Sheets

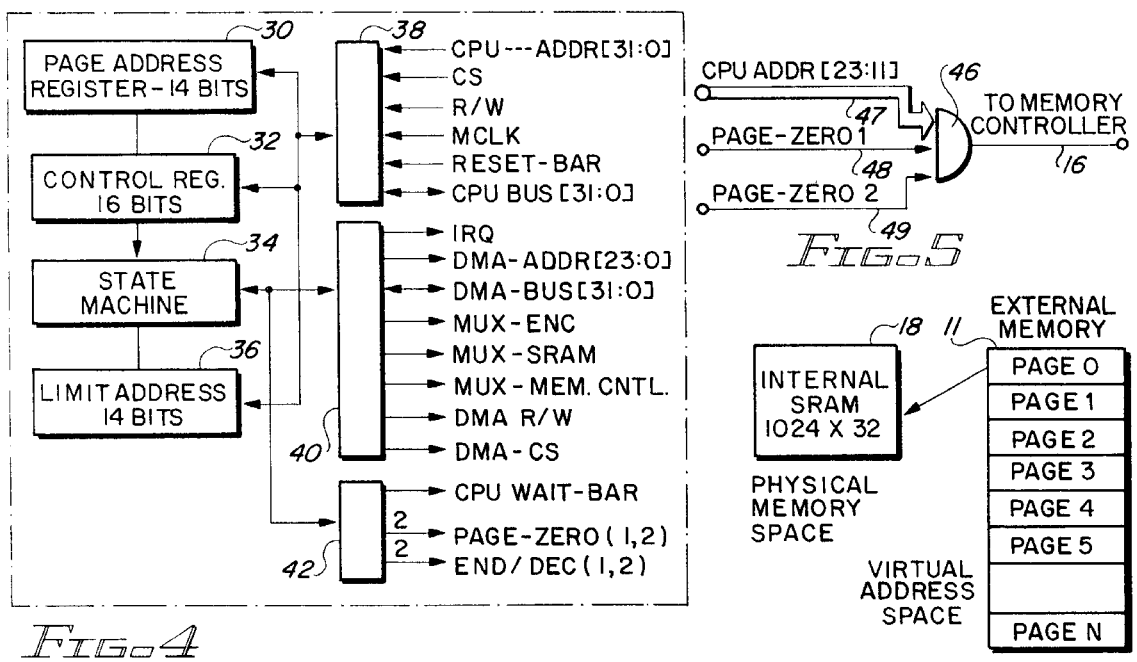
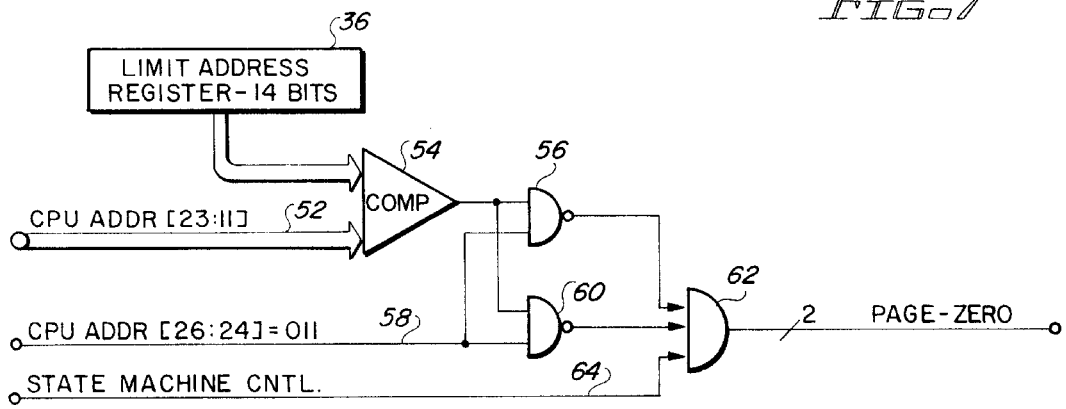
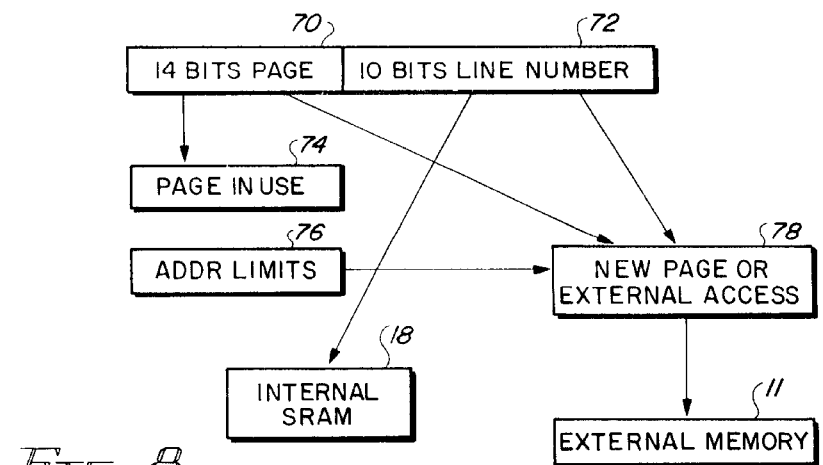

SECURE MEMORY MANAGEMENT UNIT FOR MICROPROCESSOR

BACKGROUND

Various techniques have been employed for decrypting and encrypting firmware stored in an external memory associated with a microprocessor system. Encryption of such firmware is used to prevent unauthorized parties from determining instructions or data stored in the memory by reading out the information and then utilizing the information. When this information is encrypted, unauthorized third parties are not able to use it unless they can obtain access to the unencrypted firmware which is handled by the microprocessor.

To prevent unauthorized access to the clear or unencrypted instructions and data, physical security measures have been developed by forming protective layers over a memory device to limit visual access to the memory, even if the encapsulation material over the chip is removed. Other techniques include employing polysilicon layers to carry the signals; so that the signal transmission is invisible. In addition, using multi-layer chips with criss-crossing signal paths makes it difficult to probe signal paths located in lower layers. As encryption/decryption circuits become more complex, however, it frequently is necessary to modify the microprocessor core in some manner in order to operate with the security systems.

The Yearsley U.S. Pat. No. 5,386,469 is directed to a firmware encryption/decryption system operating in real time to decrypt incoming code from an external memory. This is accomplished by a program counter operating in response to "enable bits" and "seed value" bits to determine when to "mask" the code using an encryption mask generator. The encryption mask of Yearsley is not a true encrypter using a DES (Data Encryption Standard) algorithm. Each clock cycle in the system of Yearsley unmasks the firmware in accordance with the seed and the program counter value in real time. In addition, some modification of the core microprocessor is necessary in order to use it with the Yearsley system.

It is desirable to provide a secure memory management unit which overcomes the disadvantages of the prior art, and which does not require any modification to the core microprocessor with which the memory management unit is used.

SUMMARY OF THE INVENTION

A secure embedded memory management unit for encrypted data and instruction transfer from an external memory includes a microprocessor core, an internal memory, a direct memory access controller and encryption core all formed in the same IC chip. The direct access memory controller is interconnected by a bus to an external memory, where the encrypted instructions and data are stored. Encrypted information supplied to the memory controller from the external memory then is supplied, internally in the chip, from the memory controller to the encryption core, where it is decrypted. The decrypted information then is supplied to the internal memory coupled to the microprocessor core. The information stored in the internal memory is utilized in a conventional manner in its "clear" form by the microprocessor core. The reverse of this operation occurs when information is to be written to the external memory. Information passing from and to the external memory is loaded on a page-by-page basis; and once a page of firmware has been loaded from the external memory onto the chip, the chip disables access to the bus to protect from any external probing.

BRIEF DESCRIPTION OF THE DRAWINGS

FIG. 4 is a detailed diagrammatic representation of a portion of the circuit shown in FIG. 1;

FIG. 5 is a circuit detail useful in explaining the operation of the embodiment of FIGS. 1 and 4;

FIG. 6 is circuit detail of a portion of the embodiment of FIGS. 1 and 4;

FIG. 7 is a diagrammatic representation of the relationship between memory space in the external memory and the internal memory of the embodiment shown in FIG. 1; and FIG. 8 is a diagrammatic representation of the memory organization of the internal memory of the embodiment shown in FIG. 1.

DETAILED DESCRIPTION

Figure 1:
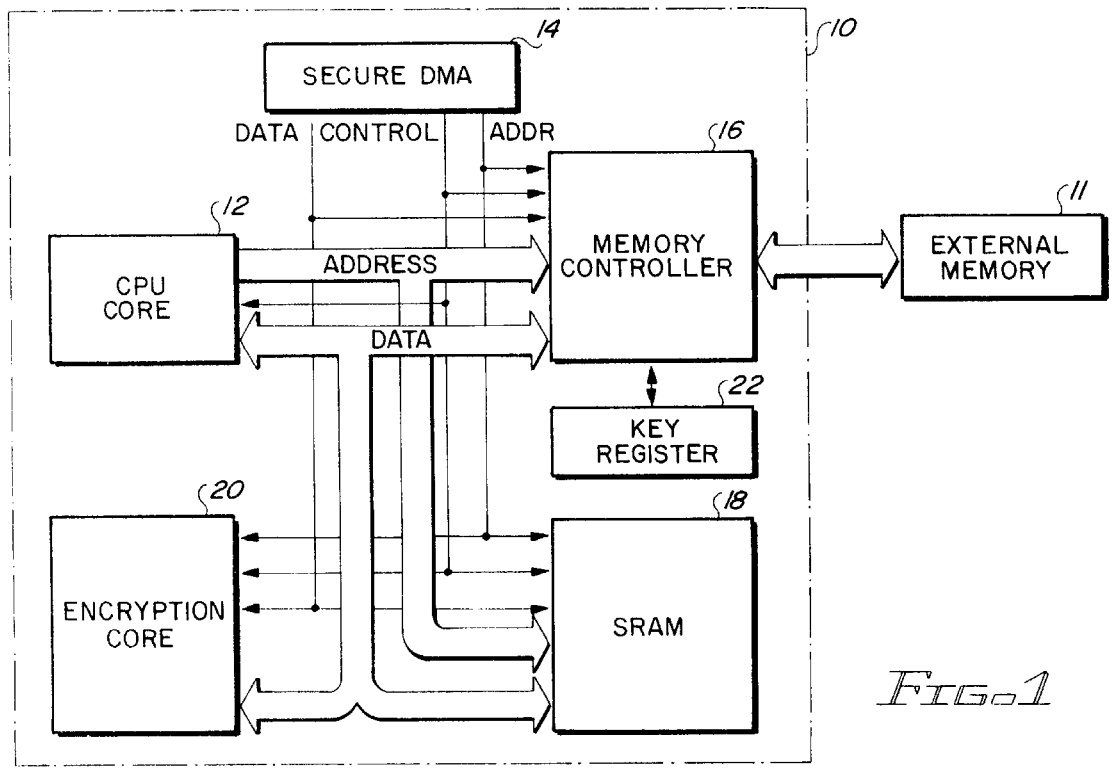
FIG. 1 is a block diagram of a preferred embodiment of the invention.

Reference now should be made to the drawings, in which the same reference numbers are used throughout the different figures to designate the same components. FIG. 1 is a block diagram of a preferred embodiment of a secure memory management unit for a microprocessor system. The system shown in FIG. 1 is fabricated on a single integrated circuit chip 10 for communication with an external memory 11, which may be of any suitable type for storing information used in the operation of the system on the chip 10. The main function of the secure memory management unit (MMU) on the chip 10 is to read encrypted external program code instructions and data stored in the external memory 11, to decrypt and store the information in a secure random access memory (RAM) with an internal microprocessor CPU core 12 then utilizing the information, which is stored in the secure internal RAM.

The circuit shown on the chip 10 of FIG. 1 is designed to carry out these functions. It should be noted that all of the parts shown enclosed within the dash-dot line or box 10 of FIG. 1 are fabricated on the same integrated circuit chip utilizing fabrication techniques designed to physically embed the components in the chip and to prevent access to the internal buses and connectors shown interconnecting the various components located within the box 10.

The secure MMU of FIG. 1 comprises a memory controller 16 and a secure direct memory access controller 14, along with an SRAM memory 18 for program storage, and a secure internal encryption core logic 20, along with a microprocessor or central processing unit (CPU) core 12.

Although an SRAM memory is shown, other types of read/write memories, such as EEPROM or FLASH ROM may be used as well. The memory 18 is divided into multiple cache sections of various sizes. The various buses for interconnecting these components for data, address and control signals are illustrated in FIG. 1.

The direct memory access (DMA) controller 14 and the memory controller 16 together operate to transfer instructions between the external memory 11 and the internal SRAM memory 18. Through appropriate instructions, the secure DMA controller 14 moves instruction from the external memory 11 through the memory controller 16 to the decryption core 20, and finally, to the SRAM memory 18 for a read cycle. For a write cycle, the instruction is moved from the SRAM memory 18 to the encryption core 20, then to the memory controller 16, and finally, from the controller 16 through a connecting bus to the external memory 11. All of these transfers of information are controlled by the secure DMA/MMU controller 14/16.

Typically, on a first external instruction access, the secure DMA controller 14 puts the CPU core 12 in a wait state mode, or the CPU core 12 executes from an internal ROM (not shown) and reads the page of external encrypted program code or data containing the requested external page address. The system operates to transfer information from and to the external memory 11 on a page-by-page basis. The page address can read or write up to 1,024×32 bit words. After the page of instructions has been written to the secure SRAM 18, the DMA controller 14 causes these instructions to be decrypted by sequentially transferring the contents of the secure internal SRAM 18 one 32-bit word at a time to the encryption and decryption core block 20. The cleared word is then written back to the SRAM 18.

When the full page of instructions has been decrypted by the encryption core 20, the DMA controller 14 takes the CPU core 12 out of the wait state mode, and the CPU core 12 reads the instruction located in the secure internal SRAM 18. As noted, this instruction now is clear or decrypted information. If the next external instruction requested by the CPU core 12 is within the page of the secure internal SRAM 18, the instruction is read in a single cycle from the secure internal SRAM 18. If the next external instruction requested is not in the page of the secure internal SRAM 18, the DMA controller 14 operates as described above, and the process is repeated. The process described may be altered, depending upon the configuration of the MMU control register consisting of the DMA controller 14 and the memory controller 16.

The secure DMA controller 14 and memory controller 16 is the interface which provides input/output (I/O) transfer of data directly to and from the external memory 11 by way of the memory controller unit 16, the encryption core 20, and the internal SRAM memory peripheral 18. The DMA controller 14 is the preferred form of data transfer for use with high speed peripheral devices to speed the encrypted instruction transfer. The CPU core 12 utilizes the DMA controller 14 by sending the selected page address to be transferred, the control configuration, and the limit addresses. This will be explained in greater detail in conjunction with FIG. 4.

The actual transfer of data is done directly between the external memory 11 and the memory controller 16, through the DMA controller 14, which frees the CPU core 12 for other tasks. The major difference between an I/O program controlled transfer and the DMA controller 14 is that data transfer does not employ the registers of the CPU core 12. The transfer is done in the DMA controller 14 interface by first checking if the memory unit 18 is not used by the CPU core 12; and then the DMA controller 14 controls the memory cycle to access a word in the external memory 11.

It should be noted that the system shown in FIG. 1 also employs the usual circuits of an interface, such as an address decoder, a control decoder, and state machine control logic (not shown, since these are standard components). In addition, the system uses a separate page address register, a limit address buffer register, and a page size count register (described in greater detail in conjunction with FIGS. 4, 5 and 6). The address and buffer registers are used for direct communication with the memory controller 16. The page size register specifies the number of words to be transferred within a page. The CPU core 12, with the DMA controller 14, includes a special state machine control section for the memory controller 16 to communicate with both the CPU core 12, the encryption core 20, the SRAM 18, and the DMA controller 14 on a priority basis.

Both the CPU core 12 and the DMA controller 14 can communicate with the memory controller 16; but the DMA controller 14 has priority over the CPU core 12. A request bit in the control register in the DMA controller 14 is set when the corresponding CPU core 12 requests a memory cycle. The memory control 16 services both the CPU core 12 and the DMA controller 14, and resolves conflicts between the two requests. Whenever a DMA controller 14 memory cycle request is terminated, the memory controller 16 clears a corresponding request flip-flop (not shown) and the DMA controller 14 waits until a new page load memory cycle is requested.

The design of the DMA controller 14 enables, but is not restricted to, allowing the code stored in the SRAM cache 18 to be accessed by the CPU core 12 while the DMA controller 14 is loading other sections of the cache. This increases the speed of operation of the system, allowing commonly used sections of code to be semi-permanently placed into the SRAM cache 18. This is accomplished by dividing the SRAM cache 18 into various sections of different sizes. Implementation of this feature may be accomplished by means of a hard division of the cache or a flexible division where the CPU core 12 and the DMA controller 14 access the memory 18 on alternate cycles of the system clock. Collision detection circuitry or software (not shown) also may be employed to prevent access to pages in the SRAM 18 while these pages are being loaded or allow accesses to the pages being loaded when a piece of memory already has been loaded into the cache 18. Such detection circuitry recognizes a page as "in process", "loaded", or "unloaded". The unloaded and partially loaded pages operate in the same manner where the offset to the page is compared to a pointer loading data. The wait signal (shown in FIG. 4) is released once the actual data is loaded. For a new cycle, this occurs when the first instruction is loaded and continues a wait/load cycle until the code jumps out of this particular page. For a page in process, the code actually may be able to run a full routine and branch out prior to ever having a collision or a wait cycle.

The initialization process for the system essentially is a program consisting of I/O instructions that include the page address and command codes for the DMA 14 interface. The CPU core 12 checks the status of the peripheral (external memory 11) and the DMA/MMU controller 14/16; and if all is in order, the CPU core 12 sends the following information through the I/O memory controller lines:

1. The starting address of the page memory block where the instructions or data are available (for output) or where data are to be stored (for input) in the SRAM 18.
2. The page size, which is the number of words in the page memory block.
3. A control specifying an input or output transfer.
4. A command to start the DMA/MMU controller 14/16.

The starting page address, page size, and the control specifying the direction of transfer are stored in designated control registers in the DMA/MMU controller 14/16. The CPU core 12 then stops communicating with the DMA/MMU controller 14/16. The DMA controller 14, which controls the memory controller 16, handles all of the housekeeping operations such as packing characters into words (for output) or unpacking words into characters (for input) and checks the status of the peripheral external memory 11.

When a word is ready to be read or written in the internal SRAM memory 18, the DMA/MMU controller 14/16 communicates directly with the memory 18 and receives a memory cycle for a word access.

The DMA/MMU controller 14/16 interface first is configured by the CPU core 12 for a page change. After that, the DMA controller 14 starts and continues to transfer data between the secure internal SRAM memory 18 and the peripheral external memory 11 through the memory controller 16 until an entire block is transferred. When the transfer is completed, the DMA controller 14 compares the status report for the CPU core 12 and then sends an interrupt request. When the CPU core 12 services the interrupt, it receives the status message from the DMA controller 14 and checks to determine if the transfer was satisfactory.

After the DMA/MMU controller 14/16 has been configured, and a request is initiated by the DMA controller 14, the CPU core 12 is either switched to an internal ROM for general housekeeping or it is put into a wait state. The DMA controller 14 then transfers a 32-bit word to the encryption core 20, which is set for a DES (Data Encryption Standard) algorithm.

Figure 2:
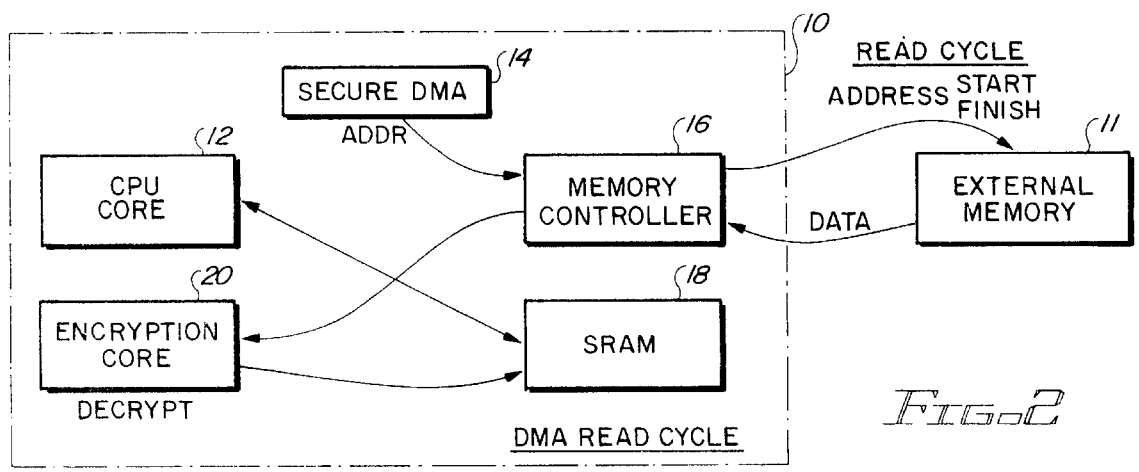
FIG. 2 is a diagrammatic flow chart illustrating the operation of embodiment of FIG. 1 for a read cycle.

Reference now also should be made to FIG. 2, which illustrates the operation of the system for reading encrypted data from the external memory and handling that data internally of the chip 10 for utilization by the CPU core 12. When data is to be read from the external memory 11, a request is made by the DMA controller 14 for reading the selected memory bank and address in the external memory 11. This request is passed through the memory controller 16 to the external memory 11. The word from the memory 11 which is to be transferred is then supplied over the line marked "data" in FIG. 2 to the memory controller 16.

The word, after it is instruction formatted, is transferred from the memory controller 16 to the encryption core 20, where it is decrypted in accordance with the encryption code built into the system. The encryption code is uniquely selected for each chip by means of a key register 22 (FIG. 1) initially programmed at the time of initial manufacture of the chip 10 to establish the timing of the encryption core 20. This key register may be selected to be unique for every chip 10; so that no common key 22 is present, even though a large number of different chips 10 may be used with different applications. The encryption key also may be downloaded with a program uncovered by some other key (shared secret key method) or loaded through public key methodologies. The manner of loading the key is unimportant. Following decryption of the word in the encryption core 20, the plain instruction is written to the SRAM memory 18. The steps are repeated until the page size is fully loaded in the SRAM 18.

Once the SRAM 18 is loaded with clear, decrypted information, the DMA controller 14 interrupts or removes the wait from the CPU core 12 for execution from the SRAM memory 18. The system is configured to cause the page to be stored in the memory 18 as a block of consecutive locations. The system programmer must design the SRAM to reserve space for data storage for a specific routine. Once the data is in the SRAM 18, the interoperation between the CPU core 12 and the SRAM 18 is in a conventional manner for executing the program or operating upon the instructions and data which have been transferred from the encrypted form in the external memory 11.

No modifications whatsoever to the CPU core 12 are required; so that standard microprocessor cores may be used in their unaltered state for the CPU core 12. No access is available to the clear data stored in the SRAM 18, since this data is buried within the chip 10 and standard multi-layer protection measurements may be taken, along with multi-layer buses and circuit interconnections within the internal buses shown in FIG. 1. Thus, probing of the clear programs, instructions, and data located within the chip 10 is not possible.

Figure 3:
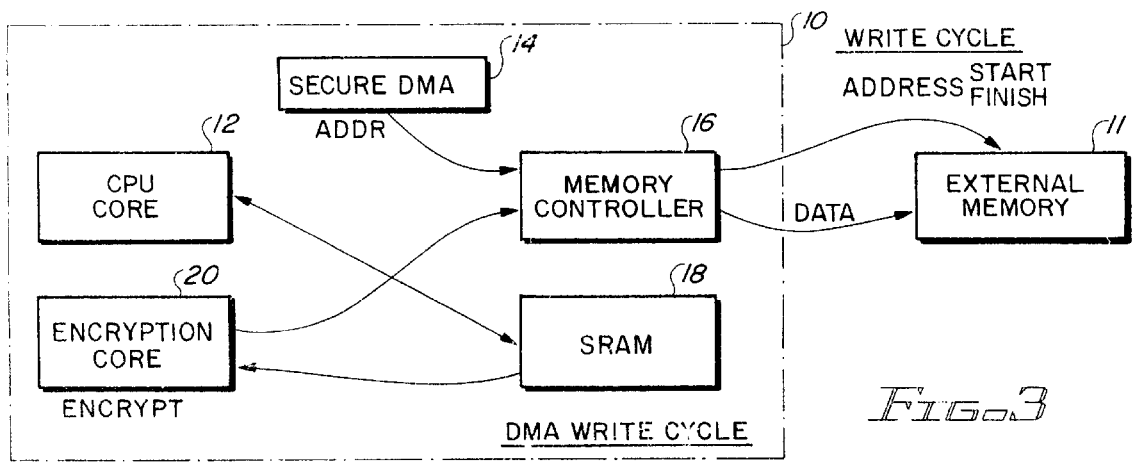
FIG. 3 is a diagrammatic flow chart illustrating the operation of the embodiment of FIG. 1 for a write cycle.

Reference now should be made to FIG. 3, which illustrates the operation of the system for a write transfer cycle initiated by the DMA controller 14. Assume that the DMA controller 14 has been configured and a write request is initiated. In this case, only the internal operating system (O/S) can initiate a protected write of control instructions or data. The write mode of operation of the system actually involves one or the other of two modes, namely 1) write data only and 2) update and re-encrypt the external memory instruction using another set of keys. The CPU core 12 uses the internal ROM (associated with it and not shown in FIG. 1) to ensure the write sequence is controlled. The DMA controller 14 transfers a 32-bit word from the SRAM 18 to the encryption core 20. Since the word stored in the SRAM 18 was "clear" or unencrypted, the transfer is made to the encryption core 20, which then encrypts the word with the DES algorithm in accordance with the key register 22. The encrypted word of instruction then is supplied from the encryption core 20 to the memory controller 16, which writes the instruction to the selected memory bank and address in the external memory 11. Thus, the new encrypted instruction or data is stored in the external memory 11.

Once again, it should be noted that the only bus where a probe of information can be obtained is the bus between the memory controller 16 and the external memory 11. At all times, whether information is being read from the external memory 11 or written to the external memory 11, the information on this bus is encrypted. The foregoing steps are repeated until the full page size is written in the external memory 11. Once the external memory page is written, the DMA controller 14 re-enables the CPU core 12 for execution from the internal ROM associated with it. The new page is stored in the external memory 11 as a block of consecutive locations.

Reference now should be made to FIG. 4, which shows the DMA/MMU controller 14/16 circuits in greater detail, along with the designations of the various signals which are applied to and from the DMA controller 14 and the memory controller 16. As shown in FIG. 4, the DMA/MMU controller 14/16 includes a 14-bit page address register 30, a control register 32 (16 bits), a state machine 34 and a limit address register 36 (14 bits). The various controller signals are shown as broken into three blocks 38, 40 and 42, with the inputs and outputs of the different blocks identified on the various blocks. The specific names of the signals which are shown in FIG. 4, the signal type and signal description are given below in the following table:

TABLE 1

| Signal Name | Signal Type | Signal Description |
|---|---|---|
| RESET-BAR | I | Active low reset signal will reset all internal registers. This signal can be asynchronous to CLOCK. |
| MCLK | I | Clock - 50% duty cycle dock used for synchronous operation. MCLK is the 180 degrees out-phase with the ARM core dock. |
| CONTROLLED MODE: DATA & CONTROL LINES | | |
| CPU Bus [31:0] | I/O | 32 bit data bi directional port for data, status, control and command. |
| ADDR [31:0] | I | 32 bit address bus used to address the control, limit, page register. Also the DMA will monitor the address for page changes. This signal must be synchronous with MCLK. The ADDR[3:0] is also used to address the control, page, and limit registers when /CS is active. |
| IRQ | O | Interrupt active after the selected multiply cycle is complete. This is an active low output. |
| /CS | I | Port Chip Select (Active Low) - This signal is used to select the I/O Port. This signal must be synchronous with MCLK. |
| R/-W | I | The R/-W input signal indicates if the I/O operation is a read (HIGH) or a write operation (low). R/-W is not latched internally . This signal must be synchronous with MCLK. When R/-W is high a write cycle is requested, logic zero indicates a read cycle. |
| MUX-SRAM | | Multiplexer select for the SRAM block |
| MUX-ENC | O | Multiplexer select for the encryptor block |
| MUX-MEM Cntl | | Multiplexer select for the Memory Controller block |
| CPU WAIT-bar | O | CPU WAIT-bar is used to place the CPU in the wait state. |
| End/Dec-1,-2 | O | Encryption and decryption dual (2) control lines to the encryptor core. These signals are used to insure the encryption core is configured correctly. A logic 1 is for encryption and logic 0 for decryption. The default state is 0 for decryption. |
| Page-zero-1,-2 | O | Page-zero-1 and -2 are active low logic and used as the page address disable outputs (2) used to zero the page address field. The default state is zero for the first page read, otherwise a logic one to pass the CPU address [23:11]. |
| DMA Bus [31:0] | I/O | 32 bit data bi directional port for DMA data transfer. |
| DMA ADDR [23:0] | I | 24 bit address bus used to address for DMA transfer. |
| DMA/CS | I | DMA Chip Select (Active Low) - This signal is used to select the peripheral. |
| DMA R/-W | I | The DMA R/-W input signal indicates if the I/O operation is a read (HIGH) or a write operation (low). R/-W is not latched internally. When R/-W is high a write cycle is requested, logic zero indicates a read cycle. |

The registers in the memory controller 16 which handle the control and status for the secure MMU are described next. The CPU core 12 can access the control/status register of the memory controller 16 only when the system is in the secure mode. The CPU core 12 address bits ADDR[1:0] selects the control or page or limit address when the signal CS is active. The R/W controls the direction of the register for the read or write cycle. The following table selects the required register:

TABLE 2

| ADDR 1 | ADDR 0 | SELECTION |
|---|---|---|
| 0 | 0 | LIMIT REGISTER HIGH |
| 0 | 1 | CONTROL REGISTER |
| 1 | 0 | PAGE REGISTER |
| 1 | 0 | LIMIT REGISTER-LOW |

The control/status register is a 16-bit read and write register located at address [3:0]=0h. The CPU core 12 address [3:0] is selected only when the CS shift select signal is active. The CPU core 12 data bus [15:0] reads or writes this register. The control/status register determines the mode of operation of the secure DMA/MMU 14/16 and its current status. This register can be read or written to at any time by the CPU core 12. The register is as follows:

TABLE 3

| 7 | 6 | 5 | 4 | 3 | 2 | 1 | 0 |
|---|---|---|---|---|---|---|---|
| New Page Detect | P2 (msb) page size | P1 page size | P0 (lsb) page size | Bypass/ Encrypt -2 | MASK WAIT | REQ DMA | Bypass/ Encrypt -1 |
| 15 | 14 | 13 | 12 | 11 | 10 | 9 | 8 |
| not used | not used | Mem Bank sel2 | Mem Bank sel1 | Mem Bank sel0 | Alarm | Page Mode -2 | Page Mode -1 |

The bit descriptions of the 16 bits of the control/status register are as follows:

BIT DESCRIPTIONS

BIT [0]:

Bypass/Encrypt 1, -2

BIT [3]

Bypass/Encrypt-1 bit control the DMA 14 to bypass the secure MMU function. In other words the instruction from the external memory 11 is treated as plain text data. The redundant bit is located at bit 3. Both bits must conform to the table below:

| Bypass/Encrypt-1 | Bypass/Encrypt-2 | Function |
|---|---|---|
| 0 | 0 | Encrypt/Decrypt(default) |
| 0 | 1 | Encrypt/Decrypt |
| 1 | 0 | Encrypt/Decrypt |
| 1 | 1 | Bypass |

The bypass can only be set if both bits are 1's. Otherwise the MMU will decrypt incoming data. Note: the encrypt or decrypt mode is set by the page write and page read control bits.

BIT 1:

REQ DMA

The REQ DMA is the control bit to start the DMA process. The default state is logic zero where the DMA 14 is not in use. When this bit is set to a logic 1, the DMA 14 is used and executes per the DMA function per the control register. After the DMA 14 completes transferring a page, this bit is reset to zero by the DMA state machine 34. Note: when REQ DMA is set to 1, the New Page Detect bit [7] will also be set. New page detect bit will also be cleared by the state machine, the same as the REQ DMA bit after the page transfer is complete.

BIT 2: MASK WAIT

The MASK WAIT is the control bit to enable or disable the CPU core 12 WAIT output. The default state is logic zero where the CPU core 12 WAIT output is enabled. When MASK WAIT is set to a logic 1, the CPU WAIT output is disabled.

BIT [4,5,6]: Page Size Selection: P2, P1, P0

The page size selection bits (P2, P1, P0) determine the size of a given page in the following increments:

| P2 | P1 | P0 | Function |
|---|---|---|---|
| 0 | 0 | 0 | 1024 words (default) |
| 0 | 0 | 1 | 875 words |
| 0 | 1 | 0 | 768 words |
| 0 | 1 | 1 | 512 words |
| 1 | 0 | 0 | 350 words |
| 1 | 0 | 1 | 256 words |
| 1 | 1 | 0 | 128 words |
| 1 | 1 | 1 | 64 words |

This register must be programmed prior to a next page detect or request. The value in this register will determine the size of a given page. If a new page is detected and the value in the page size is unchanged, the new page will be determined by the current page size value. If a new page size is required, the program must set the page size to the required value and then send a REQ DMA or a page detect to occur. It should be noted that multiple pages are provided in the SRAM 18 both for data and instructions.

BIT 7: New Page Detect Bit

The page detect bit is a status bit to indicate the DMA 14 has detected or, that a new page address has been detected on the CPU core 12 address [a26, 25, 24 is 011] indicating a new page is requested. The new page address will be compared to the limit address to verify the new page request is valid. If so, the new page address is passed to the memory controller unmodified. If the new page is invalid, the page zero 1, 2 outputs cause the page address to be zero. This is in accordance with the circuit shown in FIG. 5, which is a typical gate of the type used in the DMA controller 14 for the various functions. If the new page is invalid, an AND gate 46 has its output coupled with the memory controller 16 for determining whether the new page address is valid or invalid. The inputs to the AND gate 46 comprise the CPU core 12 addresses [23:11] applied over a bus 47 to inputs of the gate 46. In addition, inputs for page-01 and page-02 are applied over inputs 48 and 49 to the gate 46. Whenever the output of the new page detect 46 is a "1", the request DMA bit (REQ DMA) 1 of the control/status bit register also is set. If the new page request is invalid, the output from the gate 46 is "0" and this zeros the page address.

The new page detect bit also is cleared by the state machine 34 at FIG. 4 in accordance with the operation of the circuit shown in FIG. 6, after the page transfer is complete. A comparator 54 is used first to check if the page address is equal to or larger than a limit set by a limit address register 36. Thus, if the address request from the CPU core 12, ADDR [23:11] applied over a bus 52 to the comparator 54, is equal to or greater than the limit address from the circuit 50, the page-01, 2 asserts to a logic low at the output of the gate 62. This is effected by an output to the gate obtained from the state machine control input 64 and the outputs of the NAND gates 56 and 60, as illustrated in FIG. 6.

BIT [8, 9]: Page Mode-1-2

The Page Mode-1 and -2 bits are redundant select bits used to configure the DMA 14 for read or write cycle. The default mode is zeros [00] where it is set-up for a read cycle. In the read cycle, the encryptor must be configured for the decrypt mode. The ENC/DEC control is set to DEC mode. In the write mode (Page Write-1, and -2 are [11]), the DMA 14 is in the write mode to transfer the encrypted page in the SRAM 18 to the external memory.

BIT [10]: ALARM

The ALARM bit is set to a logic 1 if an invalid page is detected. A valid REQ DMA or new page detect clears this register. Also, during a page transfer, if the page address changes from the stored PAGE ADDRESS register content, the ALARM bit is set.

BIT [13:11] MEM. BANK SEL

These bits select the memory controller bank register. The DMA 14 controls the memory to direct the memory read and writes to the selected external memory element. The bits correspond to the memory controller control bits.

In conjunction with FIGS. 4, 5 and 6, it should be noted that the page address 30 stores the current page address in use. This register is loaded by two means: either by the CPU core 12 using the ADDR [1:0]=01 control to read or write to the register, or by the new page detect, where if the page address is valid, it is loaded into the page address register 30. The limit address register 36 stores the upper or lower page allowable address range. As illustrated in FIGS. 4 and 6, this is a 14-bit register in the example given. Both the upper and lower limit addresses are loaded using the ADDR [1:0] bits. When ADDR [1:0]=00, the higher limit address is loaded. When ADDR [1:0]=11, the lower limit address is loaded.

Reference now should be made to FIGS. 7 and 8 to assist in an understanding of the memory concept used in the system. The system preferably employs a virtual memory concept to load encrypted instructions from the external memory 11. The programmer has 24-bit virtual address or address spaces to work with. The actual main memory of the internal SRAM 18 is only 1024×32 bits. The address field of the SRAM 18 may be identified as a "physical address". The external memory 11 has a virtual address size of 24 bits to address instruction code, but the physical address is only 10 bits. As illustrated in FIGS. 7 and 8, 1,024 words of pages may be transferred from the external memory 11 to the internal SRAM 18. The content is decrypted and transferred to the SRAM 18 by way of the secure DMA control described previously in conjunction with FIGS. 1 through 3.

The DMA control 14 maps the virtual memory address of 24 bits to 10 bits of physical address shown as the 10 bits line No. 72 in FIG. 6. This mapping is a dynamic operation, which means that every address is monitored for page jumps and page boundaries. The DMA memory controller 16 controls the data flow for different memory sizes and speeds. The DMA controller 14 monitors the page address portion of the CPU core 12 address field to determine when a new page is required. The DMA controller 14 also restricts address locations for secure memory areas.

To simplify implementation of the address mapping, the information in the address space and the memory space each are divided into groups of fixed size. The secure MMU physical memory in the internal SRAM 18 is broken down into a page size which may range from 64 to 1024 words each. The page size is programmable to read or write information up to 1024 words. The size of the internal SRAM 18 is referred to as a block. The term "page" refers to groups of address space of the same size.

For example, assume a page consists of 1K words. Then, and if the external memory 11 is 20K words deep, the address space of the external memory is divided into 20 pages, as illustrated in FIG. 7; and the internal SRAM memory 18 is set to a 1K block. Although both a page and a block are split into groups of 1K words, a page refers to the organization of address space, while a block refers to the organization of the internal memory space in the SRAM 18. The external programs in the memory 11 therefore must be split into pages. Portions of programs are moved from the external memory 11 to the internal SRAM memory 18 in block records equal to the size of a page. At any given time, only one page of address space may reside in the internal SRAM memory 18. A current page, however, may require "read" or "write" to an external memory location for data transfer without changing pages. To do this, the DMA controller 14 and the memory controller 16 provide access to the routine for external memory access to the memory 11.

As shown in FIG. 8, the mapping from address space in the internal SRAM 18 to external memory space in the memory 11 is facilitated if each virtual address in the memory 11 is considered to be represented by two numbers, namely a page number address and a line within the page. In the example under consideration, the virtual address has 24 bits. Since each page consists of 1024 words, the high order fourteen (14) bits of a virtual address specifies one of the $2^{14}$ pages; and the low order ten (10) bits give the line address within the page. This is shown by the division of the blocks 70 and 72 in FIG. 8 designating the total number of 24 bits in the virtual address in the memory 11. It should be noted that the physical address in the internal address space and the external memory space is the same, the only mapping required is from a page number to a block number.

A read or write signal to the internal SRAM 18 transfers the contents of the word to the CPU core 12 ready to be executed. The SRAM 18 is addressed using a 10-bit CPU core address field provided the virtual address points to the page in use (74 in FIG. 8). If the page address does not reside in the internal SRAM address space (that is if it is a new page), a call to the DMA subsystem then is generated, as shown at 78, to fetch the required page from the external memory 11 and place it into the internal SRAM via 70/72 before resuming computation.

Continuing with reference to FIGS. 7 and 8, the secure MMU of the system is implemented by means of an associative memory page register with 1K words in memory containing a page number. The page field in each word is compared with the page number in the virtual address for the memory 11. If a match occurs, the word is read from internal SRAM memory 18 and its corresponding routine is executed. In addition, a limit register also is compared to ensure certain areas are restricted. If an illegal page is detected, a power-up page selected and executed.

The virtual address is placed in the DMA/MMU register 14/16. The page number bits in the DMA/MMU register 14/16 are compared with the page address register in use at 74 in the internal memory. If the page number matches, the word is read out from memory. If no match occurs, the CPU core 12 is requested to call to the DMA controller 14 to load the required page from the external memory 11. During a new page upload, the CPU core 12 can communicate with its internal ROM for housekeeping routines until the SRAM memory 18 is filled and authenticated.

It should be noted that when the CPU core 12 initially starts an internal program execution, one of the pages is transferred into the internal SRAM memory 18 in accordance with the decryption techniques described previously. The page register in the status word then is set to indicate the page position. The program is executed by the CPU core 12 from the internal SRAM memory 18 until the CPU core 12 attempts to reference a location that is still in the external memory 11. When this occurs, the DMA controller 14 operates to retrieve the required page from the external memory 11 and supply it, in accordance with the description above for the operation of FIGS. 1 and 2, to the internal SRAM memory 18. In the meantime, control is transferred by the DMA controller 14 to the next program in the internal ROM memory for the CPU core 12 that is waiting to be processed in the CPU core 12. The memory management firmware system determines which page to remove from the internal SRAM 18 (if any) and what page and what size to bring in its place. Later, when the memory block in the SRAM memory 18 has been assigned and the transfer completed, the new program may resume.

Currently available techniques also may be employed to provide memory protection to prevent one program from changing another program. This may be achieved by placing additional bits in each word of the memory page address to indicate whether the corresponding block in the internal SRAM 18 or external memory 11 can be accessed for reading, writing or not at all. Such decisions are made in the DMA controller 14 by matching the protection bits in the page register with a key code in the program being executed. Such protection bits can be used to specify whether the page is available to the current program for reading or writing data only to the external memory, or for reading only (write protection), or full protection (restricted access), or finally, no operation. Write protection is useful for sharing system programs such as utility programs and other common subroutines. Typically, these system programs are stored in an area of memory where they can be shared by many routines. They may be read by many programs but no writing is allowed, which protects them from being changed by other programs.

In addition to the features described above, the system also may be fabricated with specific bus protection logic, also formed as part of the same internal chip configuration. Also in accordance with conventional techniques, the system should operate with a "power on" reset to ensure that the system begins operation in the correct configuration. In addition to the features described above, the security aspect of the system may be expanded to incorporate physical protection of the components as part of the single chip implementation. Such techniques, which include multiple layer wiring and other secure techniques, may be implemented to increase the difficulty of tampering with the system once it is fabricated into a chip package.

The foregoing description of the preferred embodiment of the invention is to be considered as illustrative and not as limiting. Various changes and modifications will occur to those skilled in the art for performing substantially the same function, in substantially the same way, to achieve substantially the same result without departing from the true scope of the invention as defined in the appended claims.

What is claimed is:

1. A secure embedded memory management unit for encrypted data and instruction transfer from an external memory including in combination:

a microprocessor core;

an internal memory;

an interface bus;

a secure direct memory access controller internally coupled with and physically embedded with said microprocessor core and said internal memory in the same integrated circuit (IC) chip, said controller coupled with said interface bus for input/output (I/O) transfer of page blocks of encrypted data and instructions to and from an external memory; and encryption/decryption logic in said IC chip internally coupled with and physically embedded with said microprocessor core, said internal memory and said direct memory access controller and operating to encrypt data and instructions supplied thereto from said internal memory and transferring said encrypted data and instructions to said direct memory access controller for transfer from said controller and through said interface thereof to an external memory; and said encryption/decryption logic operating to decrypt data and instructions supplied to said interface of said direct memory access controller from said external memory and through said controller to said encryption/decryption logic for supplying said decrypted data and instructions to said internal memory for use by said microprocessor core.

2. The combination according to claim 1 wherein said internal memory is a read/write memory.

3. The combination according to claim 2 further including a key register on said chip coupled with said direct memory access controller and programmed for establishing the timing of said encryption of said data and instructions and said decryption of said data and instructions.

4. The combination according to claim 1 wherein said internal memory is an SRAM memory.

5. The combination according to claim 1 further including a key register on said chip coupled with said direct memory access controller and programmed at the time of manufacture of said chip for establishing the timing of said encryption of said data and instructions and said decryption of said data and instructions.

6. A method for securely decrypting and encrypting information obtained from and supplied to an external memory comprising the steps of:

fabricating a microprocessor core, an internal memory, and a secure direct memory controller on the same integrated circuit chip with internal coupling on said chip between said microprocessor core, said internal memory and said direct memory access controller;

transferring encrypted data and instructions to and from an external memory through an interface between said direct memory access controller and said external memory;

providing encryption/decryption logic in said integrated circuit chip, with internal buses in said chip interconnecting said direct memory access controller, said microprocessor core, said internal memory, and said encryption/decryption logic to permit decrypting data and instructions obtained from said external memory by said direct memory access controller entirely within said chip.

7. The method according to claim 6 further including the steps of supplying unencrypted data and instructions from said microprocessor core to said internal memory, transferring said data and instructions from said internal memory to said encryption/decryption logic for encrypting said data and instructions; supplying said encrypted data and instructions to said direct memory access controller, supplying said encrypted data and instructions from said direct memory access controller to an external memory connected with said interface.

* * * * *